I. G. MACFARLANE.

Seed Planter.

No. 118. A. I. Patented Feb. 6, 1855.

Bottom view

Witnesses:
Wm Bamwell
Hm H. Howard

Inventor:
I. Graham Macfarlane

N. PETERS, PHOTO-LITHOGRAPHER, WASHINGTON, D. C.

UNITED STATES PATENT OFFICE.

I. GRAHAM McFARLANE, PERRY COUNTY, PENNSYLVANIA.

IMPROVEMENT IN SEED-PLANTERS.

Specification forming part of Letters Patent No. 10,655, dated March 14, 1854; Additional Improvement No. 118, dated February 6, 1855.

*To all whom it may concern:*

Be it known that I, I. GRAHAM McFARLANE, of the county of Perry, in the State of Pennsylvania, have made certain new and useful Improvements on my Seed-Planter for which Letters Patent of the United States were granted to me on the 14th day of March, A. D. 1854, which improvements were made subsequently to the date of said patent; and I do hereby declare that the following is a full, clear, and exact description thereof, reference being had to the annexed drawings, forming part of this specification, in which—

Figure 1:
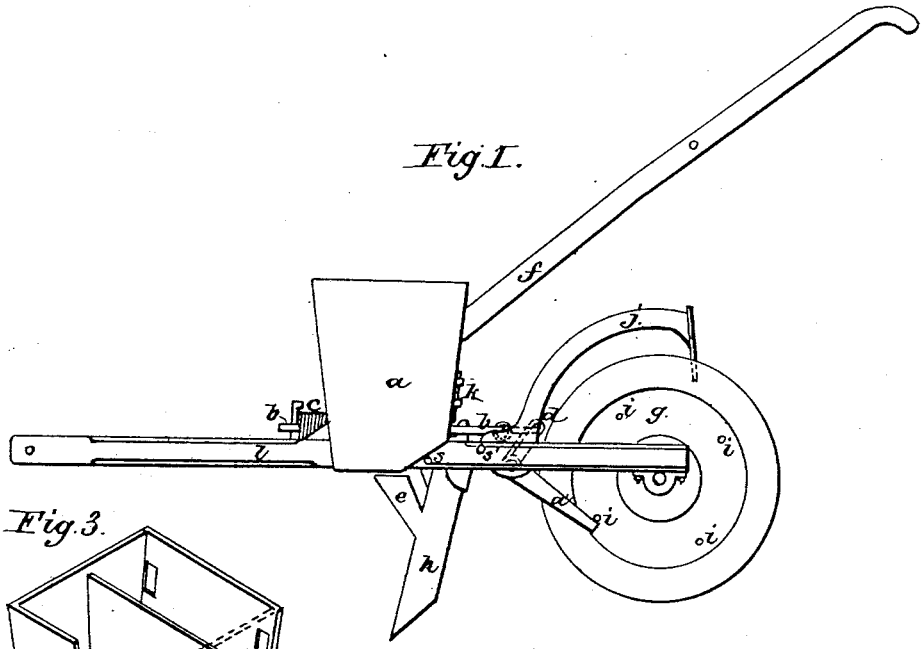
Figure 3:
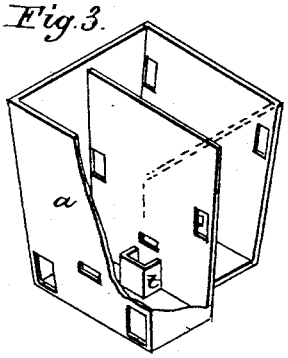
Figure 2:
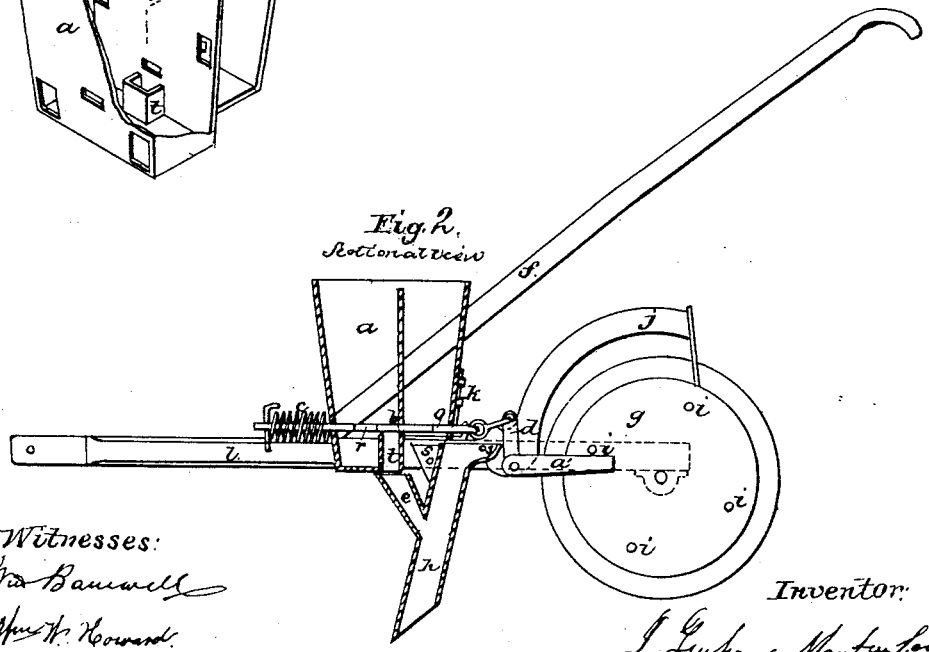

Figure 1 is a side view of my improved seed-planter. Fig. 2 is a longitudinal sectional view through the center of my seed-planter. Fig. 3 is a perspective view of the box of the planter, a portion of the sides being removed to show the interior.

The nature of my improvements consists in attaching the box or hopper immediately to the beam, and securing the handles thereto by means of holes made in the cast-iron box or hopper, or by other equivalent device; also, in making the bottom of the lime-compartment lower than the bottom of the seed-compartment, the slide resting on the bottom of the seed-box, but being above the bottom of the lime-box, a pipe placed around the aperture in the bottom lime-box leading from the aperture to and nearly touching the slide, the object of this arrangement being to avoid the choking of the aperture in the bottom of the lime-box, and to prevent the slide getting fast by lime being bedded in the bottom of the box under the slide, the edge of the pipe around the aperture, although not quite touching the under face of the slide, acting as a scraper to keep the slide clean.

In the drawings, *a* is the hopper or box, which is constructed all in one piece of cast-iron or other suitable material. On each side are holes to allow the beams *l l* to pass through. These beams are placed at an acute angle, and are united at the feet of the machine, the tail of the beams being far enough apart to receive the wheel *g* between them. The beams *l l* thus passing through the bottom of the hopper *a* are fastened to it, if necessary, by wedges or screws. The handles *f f* also pass through apertures left in the sides of the hopper *a* and are mortised or bolted at the end to the beam immediately in front of the hopper *a*. The iron drill *h* is tubular, and serves the double purpose of a drill and funnel. The upper end is open and lies level with the bottom of the seed-box of the hopper, and immediately outside of it and under the scraper. A branch pipe, *e*, leads from the funnel or drill *h* to the aperture in the bottom of the lime-box. The drill *h* is kept in its place by two bolts, *s′ s*, passing through the beams *l l*. The hopper *a* is divided into two compartments by a partition extending from top to bottom across the machine. The front compartment, used for lime, guano, or similar fertilizer, has its bottom level with the under side of the beams *l l*. The bottom of the seed-box, which is the hinder compartment, is level with the upper side of the beams. A tube, *t*, is placed around the aperture in the bottom of the lime-box, and extends up to within a short distance from the under surface of the slide *b*, for the purpose before stated. The slide *b* passes lengthwise through the center of the hopper *a*, through both compartments. One end is attached to a bent lever, *d d′*, which is attached to and has its fulcrum in the arm of the scraper *j*, and the other end of the slide is kept in its place by a spiral spring, *c*. The arm *d′* of the lever, being operated by pins *i i i*, &c., projecting at regular intervals from the side of the operating-wheel *g*, draws the slide *b* forward, and when the pins release the arm *d′* the spring brings the slide *b* back to its place, thus producing, as the machine progresses, regular intermittent motion of the slide, the frequency of which may be regulated according to the width at which the seed is to be sown by adding to or diminishing the number of pins in the side of the wheel. In the seed-box the slide *b* has a round hole, *o*, large enough to receive the requisite number of grains of seed, and the slide, resting on the bottom of the box, draws the seed out, and dropping them through the funnel of the drill *h*, the self-acting scraper *k* preventing too many seeds being drawn out of the seed-box. In the lime-box the slide *b* has a longitudinal hole large enough to contain the proper amount of lime, guano, &c., and the action of the slide brings this hole containing the lime over the top of the pipe around the aperture of the lime-box, discharging the lime through the tube *e* into the funnel of the drill *h*. The wheel *g* has a grooved periphery, as described in the Letters Patent granted to me as before stated, and is attached and constructed as therein described. The iron scraper *j*, instead of being attached to the hopper, as in my former patent, has its fulcrum at the bolt *s'*. The advantage of this is that, instead of pushing against the hopper and tending to loosen it, it is supported by the beams *l l*. This arrangement also relieves the hopper from the strain caused by the action of the spring, as the fulcrum of the bent lever *d* is in the arm of the scraper *j*, which by my new arrangement is supported, not by the hopper, but by the beams *l l*.

My improvements thus described tend very materially to the simplicity, strength, and durability of my machine, and insures its working without liability to get out of order.

What I claim as my invention, and desire to secure by Letters Patent, is—

The attaching the box or hopper to the beam and handles by means of holes left in casting the box, or any equivalent device; also, in placing the bottom of the lime-box below the slide, for the purpose of preventing the lime choking the machine and impeding its action, substantially as hereinbefore described.

I. GRAHAM McFARLANE.

Witnesses:

M. BUCKMASTER,

WM. N. HOWARD.